United States Patent
Yoshimura et al.

[15] 3,679,707
[45] July 25, 1972

[54] CURING AGENT FOR EPOXY RESINS

[72] Inventors: Ippei Yoshimura, Tokyo; Norihiko Fukue; Hiroshi Sakamoto, both of Kawasaki-shi; Hisashi Murofushi, Tokyo; Takami Hiyama; Takao Matsunaga, both of Yokohama-shi, all of Japan

[73] Assignee: Ajinomoto Co., Inc., Tokyo, Japan

[22] Filed: Nov. 26, 1969

[21] Appl. No.: 880,356

Related U.S. Application Data

[63] Continuation-in-part of Ser. No. 560,067, June 24, 1966, abandoned.

[30] Foreign Application Priority Data

June 26, 1965 Japan.....................................40/38175
Feb. 9, 1966 Japan......................................41/7496

[52] U.S. Cl........................260/340.7, 260/45.8, 260/47 EN
[51] Int. Cl. .......................................................C07d 15/04
[58] Field of Search...............................................260/340.7

[56] References Cited

UNITED STATES PATENTS 3,128,255   4/1964   McGary et al..............................260/2

OTHER PUBLICATIONS

Merten et al., " Chemical Abstracts," Vol. 60 (1964), Col. 5711h

*Primary Examiner*—Alex Mazel
*Assistant Examiner*—James H. Turnipseed
*Attorney*—Kelman and Berman

[57] ABSTRACT

Epoxides and acrylonitrile react with spiroacetal diamines of the formula

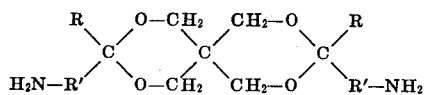

to form a viscous liquid which is a good hardener for epoxy resin intermediates, in the formula R being hydrogen, methyl, or ethyl, and R' being alkyl having one to six carbon atoms. Epoxy resins cured by means of the hardener are flexible, colorless and transparent.

2 Claims, No Drawings

CURING AGENT FOR EPOXY RESINS

This application is a continuation-in-part of our copending application, Ser. No. 560,067, filed June 24, 1966, and now abandoned.

This invention relates to epoxy resin compositions, and particularly to curing agents effective for curing such compositions at room temperature.

Polyamines, acid anhydrides, polyamides and polysulfides have been used commercially heretofore as curing agents in epoxy resin compositions. The flexibility often required of the cured epoxy resin in coatings, adhesives and castings could be achieved by the use of polyamide and polysulfide curing agents, but only at the cost of reduced tensile and flexural strength in the cured resins. Moreover, full curing by means of these agents could be achieved only at elevated temperature. The cured resins lack full transparency and are not colorless.

We now have found that epoxy resin intermediates can be cured completely at room temperature to colorless and transparent resins having excellent flexibility without loss of mechanical strength by the use of certain modified spiroacetal diamines as curing agents. The curing agents of the invention are reaction products of epoxides or of acrylonitrile with a spiroacetal diamine of the formula

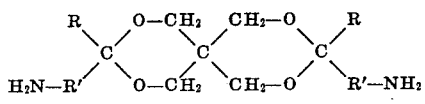

wherein R is hydrogen, methyl or ethyl, and R' is straight or branched-chain alkyl having one to six carbon atoms.

The curing agents of the invention are stable and do not discolor in storage, during curing or after curing. They produce hard, tough, substantially colorless and transparent cured resins from all epoxy resin intermediates in present commercial use or otherwise available to us.

Spiroacetal diamine compounds of the above formula which have been used successfully for preparing the curing agents of the present invention include 3,9-bis(aminomethyl)-2,4,8,10-tetraoxaspiro[5,5]undecane, 3,9-bis(2-aminoethyl)-2,4,8,10-tetraoxaspiro[5,5]undecane, 3,9-diethyl-3,9-bis(2-aminoethyl)-2,4,8,10-tetraoxaspiro-[5,5]undecane, 3,9-bis(3-aminopropyl)-2,4,8,10-tetraoxaspiro[5,5]undecane, 3,9-bis(4-aminobutyl)-2,4,8,10-tetraoxaspiro[5,5]undecane, 3,9-bis(1,1-dimethyl-4-aminobutyl)-2,4,8,10-tetraoxaspiro-[5,5]undecane, and the like. The spiroacetal diamine compounds may be prepared by the methods disclosed in the German Pat. No. 1,092,029 or the U.S. Pat. No. 2,996,517 wherein formyl nitrile and pentaerythritol are reacted in the presence of an acid catalyst, and the formed intermediate 3,9-bis(cyanoalkyl)-2,4,8,10-tetraoxaspiro [5,5]undecane is subjected to catalytic hydrogenation. They may also be prepared by reacting an aminoaldehyde acetal with pentaerythritol in the presence of an acid catalyst.

If epoxides are used as adduct components with the spiroacetal diamines, any epoxide having at least one oxirane group in the molecule may be used. Examples of such epoxides are alkyl and alkenyl glycidyl ethers, aryl glycidyl ethers, glycidyl esters, alkylene oxides, alicyclic epoxides, and epoxidized vegetal and animal oils. Representatives of these groups which have been found effective for the purposes of this invention are listed below, but it will be evident from the varied nature of the listed compounds that many other epoxides may similarly be employed. We are not aware of epoxides not capable of forming adducts with the aforedefined spiroacetal diamine compounds, nor of such adducts which would not be suitable as hardeners for epoxy resin compositions. In the following list, G is glycidyl

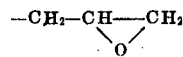

(1) Alkyl and Alkenyl Glycidyl Ethers

| | |
|---|---|
| n-Propyl glycidyl ether | $C_3H_7$—OG |
| n-Butyl glycidyl ether | $C_4H_9$—OG |
| Allyl glycidyl ether | $CH_2$═CH—$CH_2$—OG |
| Diglycidyl ether | G—O—G |
| Diethyleneglycol diglycidyl ether | G—O—($CH_2CH_2$—O)$_2$—G |
| Triethyleneglycol diglycidyl ether | G—O—($CH_2CH_2$—O)$_3$—G |
| Butanediol diglycidyl ether | GO—($CH_2$)$_4$—OG |
| Glycerine diglycidyl ether | GO—$CH_2$—CHOH—$CH_2$—OG |
| Polyethyleneglycol diglycidyl ether | GO—($CH_2CH_2$O)$_n$—OG |

(n being an integer greater than 3)

(2) Aryl Glycidyl Ethers

| | |
|---|---|
| Phenyl glycidyl ether | $C_6H_5$—OG |
| Cresyl glycidyl ether | $CH_3$—$C_6H_4$—OG |
| p-Butylphenyl glycidyl ether | $C_4H_9$—$C_6H_4$—OG |
| P-Pentadecylphenyl glycidyl ether | $C_{15}H_{31}$—$C_6H_4$—OG |
| Diglycidyl ether of Bisphenol A (Epon) | G-[O—$C_6H_4$—C($CH_3$)$_2$—$C_6H_4$—O$CH_2$—CHOH—$CH_2$]$_n$—O—$C_6H_4$—C($CH_3$)$_2$—$C_6H_4$—OG |
| | wherein n is zero or an integer |
| Diglycidyl ether of resorcinol | GO—$C_6H_4$—OG |
| m-Glycidylphenyl glycidyl ether | G—$C_6H_4$—OG |
| Diglycidyl ether of diphenolic acid | G—O—$C_6H_4$—C($CH_3$)—$C_6H_4$—OG<br>\|<br>$CH_2CH_2$COOH |
| Polyglycidyl ether of novolac resin | G—O—$C_6H_4$—$CH_2$—(GO—$C_6H_3$—$CH_2$)$_n$—$C_6H_4$—OG |
| Diglycidyl ether of hydroquinone | GO—$C_6H_4$—OG |
| Diglycidyl ether of catechol | GO—$C_6H_4$—OG |
| Triglycidyl ether of phloroglucinol | (GO)$_3$—$C_6H_3$ |

(3) Glycidyl Esters

Cardura E, a commercial product, mainly consisting of glycidyl esters of synthetic tertiary fatty acids,

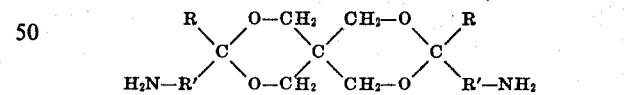

wherein $R_1$, $R_2$, $R_3$ are saturated aliphatic chains, and the total number of carbon atoms in the acid moiety of the molecule is between 9 and 11.

| | |
|---|---|
| Glycidyl methacrylate | $CH_2$═C($CH_3$)—COOG |
| Glycidyl esters of polymeric fatty acid | G—OCO—R—COO—G |
| R=polymeric fatty acid radical | |
| Glycidyl esters of adipic and sebacic acid | G—OCO—($CH_2$)$_{n'}$COOG |
| n'=4 or 6 | |
| Glycidyl ester of phenolphthalein | G—OCO—$C_6H_4$—C($C_7H_4O_2$)—$C_6H_4$—COO—G |
| Glycidyl ether ester of 2,4,6-tribromo-3-hydroxybenzoic acid | G-OCO-$C_6$HBr$_3$OG |

(4) Alkylene oxides:

| | |
|---|---|
| Ethylene oxide | $CH_2$—$CH_2$<br>\\ /<br>O |
| Propylene oxide | $CH_3CH$—$CH_2$<br>\\ /<br>O |
| Octylene oxide | $C_6H_{11}$—CH—CHCH$_3$<br>\\ /<br>O |

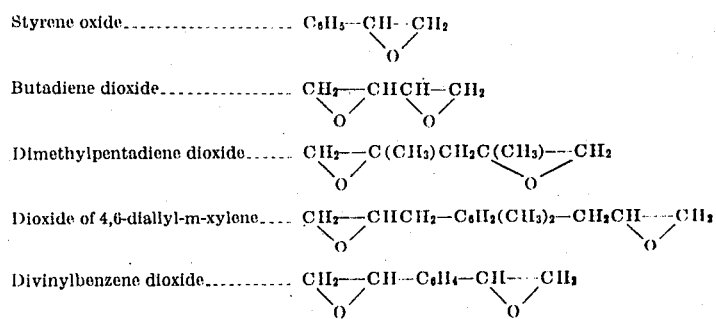

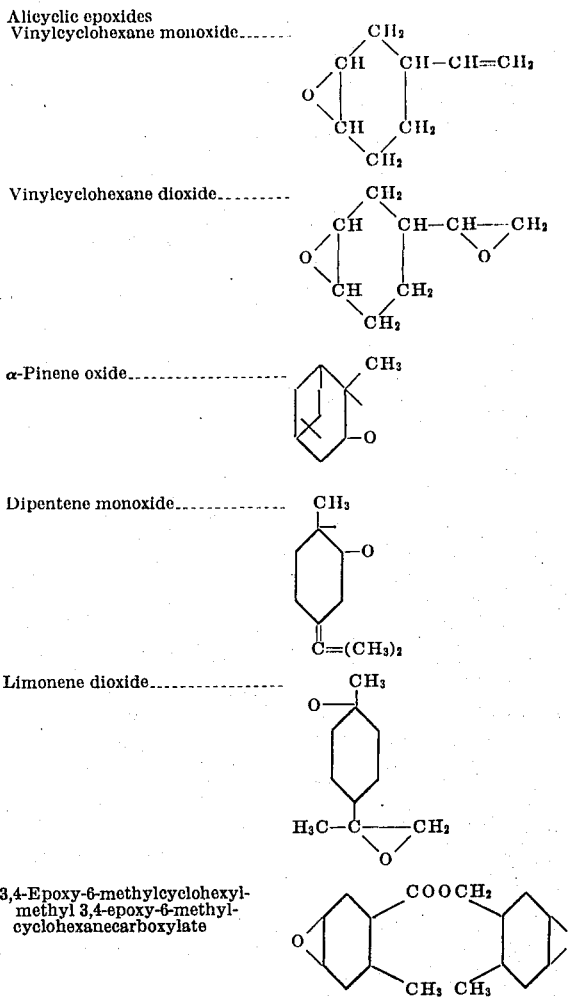

(6) Epoxidized Oils
Epoxidized soybean oils
Epoxidized tallow oil
Epoxidized lemon oil
Epoxidized lanoline oil The curing agents of the invention are prepared by heating a mixture of the spiroacetal diamine with an epoxide or with acrylonitrile with or without a solvent inert to the reactants. Suitable solvents include methanol, ethanol, butanol, benzene, toluene, xylene, dioxane, ethyleneglycol monomethyl ether, ethyleneglycol monoethyl ether and the like. Heating is continued until a homogeneous viscous liquid is obtained after removal of the solvent, if any. The reaction temperature is preferably above the melting point of the diamine and below the boiling point of the epoxide or acrylonitrile so that the mixture is liquid. However, temperatures between 20° and 150° C. are usually satisfactory, and the time required varies inversely with the termperature.

It is preferred to use more than 0.25 mole of spiroacetal diamine per oxirane mole equivalent of the epoxide in the reaction mixture or per mole of acrylonitrile, but as much as 10 moles of spiroacetal diamine may be employed. A curing agent prepared with less than 0.25 mole spiroacetal diamine per oxirane mole equivalent of the epoxide or per mole of the acrylonitrile does not completely cure an epoxy resin because of inadequate cross-linking, and the partly cured resin has poor chemical and mechanical properties. When more than 10 moles of spiroacetal diamine are employed in preparing the curing agent per oxirane mole equivalent or per mole acrylonitrile, the diamine, which remains partly unreacted, crystallizes sooner or later and impairs the workability of the cured plastic.

The viscous liquid reaction product, which consists of a condensation product of the diamine with the epoxide or an addition product of the diamine with acrylonitrile, may be subjected to fractional distillation to remove solvent or an excess of spiroacetal diamine if present, but small amounts of solvent or unreacted diamine do not normally interfere with the normal curing action, and need not be removed.

Best results are generally obtained with curing agents prepared from 0.5 to 6 mole spiroacetal diamine per oxirane mole equivalent of epoxide or per mole of acrylonitrile.

The curing agents of the invention are colorless and transparent. They do not irritate the skin upon contact. No discoloration of the curing agents has been observed in three months of storage at room temperature. Storage for more than two months at temperatures below 5° C. did not cause the unreacted spiroacetal diamine to crystallize nor otherwise to precipitate.

Representative epoxy resin intermediates capable of being cured by the curing agents of this invention are those based on the glycidyl ethers of polyhydric phenols, such as 2,2-bis(4-hydroxyphenyl)-propane, resorcinol, hydroquinone, pyrocatechol, saligenin, 4,4-diphenylhydroxybiphenyl, 1,5-dihydroxynaphthalene, dihydroxydiphenylmethane, dihydroxydiphenylsulfone, and on the glycidyl ethers of polyhydric alcohols, such as ethylene glycol, propylene glycol and glycerin.

The required amount of curing agent is determined by the number of active hydrogen atoms in the curing agent employed, and the number of oxirane groups in the epoxy resin intermediate. In general, it is preferred to use equivalent weights of spiroacetal diamine adducts and epoxy resin intermediates. However, the properties of the cured resin are not significantly affected by variations of not more than 20 percent in the amount of the curing agent.

The epoxy resins cured according to this invention are superior to resins produced from the same intermediates by means of conventional curing agents by a combination of better flexural properties, higher impact resistance, and better thermal shock resistance with equal or superior tensile strength and hardness.

The epoxy resin intermediates can be cured completely at room temperature to colorless and transparent resins having excellent mechanical properties. Heating is unnecessary, but may be resorted to for obtaining maximum strength in a shorter time. Even when cured at elevated temperature, the cured resins are not stained by the curing agents of this invention.

The curing agents are compatible with all conventional fillers, diluents, reinforcing agents, pigments and other processing agents, such as flow control additives and accelerators, so that resin compositions may be formulated according to the intended application in the usual manner.

The following examples further illustrate the present invention, but it will be understood that the invention is not limited thereto.

EXAMPLE 1

In a four-necked flask equipped with a stirrer, a reflux condenser, a dropping funnel and a thermometer, 109.6 g (0.4 mole) 3,9-bis(3-aminopropyl)-2,4,8,10-tetroxaspiro[5,5]dundecane (hereinafter referred to as ATU) were heated to 45°–55° C. To the melt so obtained, 30.0 g (0.2 mole) phenylglycidyl ether were added drop by drop over a period of two hours, and the mixture was kept at the same temperature for one hour longer. A colorless and transparent, viscous, liquid mixture of the reaction product and of unreacted ATU was obtained. When stored below 5° C. for 24 hours and for three months at room temperature, the mixture did not form a precipitate.

The same procedure was used in preparing other curing agents from diamines and epoxides as listed in Table I. Cardura E is a commercially produced glycidyl ester more closely identified above. Epon is a registered Trademark for various phenyl glycidyl ethers of the formula indicated above, all of which form curing agents with the spiroacetal diamines of this invention.

TABLE 1

| Curing Agent No. | Spiroacetal Diamine | Epoxide | Mole Ratio Diamine/Epoxide |
|---|---|---|---|
| 1 | ATU | Phenyl glycidyl ether | 2:1 |
| 2 | ATU | Allyl glycidyl ether | 1:1 |
| 3 | ATU | Allyl glycidyl ether | 2:1 |
| 4 | ATU | Butyl glycidyl ether | 1:1 |
| 5 | ATU | Butyl glycidyl ether | 2:1 |
| 6 | ATU | Cardura E | 1:1 |
| 7 | ATU | Cardura E | 2:1 |
| 8 | ATU | Note (1) | 2:1 |
| 9 | ATU | Epon 1001 | 2:1 |
| 10 | Note (2) | Phenyl glycidyl ether | 2:1 |
| 11 | Note (3) | Butyl glycidyl ether | 2:1 |
| 12 | Note (4) | Butyl glycidyl ether | 1:1 |

Notes: (1) : 3,4-epoxy-6-methylcyclohexylmethyl 3,4-epoxy-6-methylcyclohexanecarboxylate
(2) : 3,9-bis(4-aminobutyl)-2,4,8,10-tetroxaspiro[5,5]cundecane
(3) : 3,9-bis(2-aminoethyl)-2,4,8,10-tetroxaspiro[5,5]cundecane
(4) : 3,9-bis(2-aminoethyl)-3,9-diethyl-2,4,8,10-tetroxaspiro[5,5]undecane

EXAMPLE 2

The curing agents listed in Table 1 were mixed with Epon 828 in the weight percentage ratios listed in Table 2 (grams curing agent per 100 g Epon 828), and 50 g batches of the several mixtures were stored in identical containers in an air-conditioned room at 20°±1° C. and 65 percent relative humidity. For comparison, two batches of Epon 828 were mixed with conventional, typical polyamine and polyamide curing agents respectively in the ratios recommended. The polyamine was triethylene tetramine (TETA), the polyamide curing agent a commercial product whose precise composition is not known (Tohmide 245), and which has an amine value of 400. The pot lives in minutes and maximum exotherms of the mixtures are listed in Table 2.

TABLE 2

| Curing Agent No. | | | Pot Life, min. | Max. exotherm, °C |
|---|---|---|---|---|
| 1 | 60% | 40 | | 97 |
| 2 | 60 | 65 | | 61 |
| 3 | 50 | 65 | | 103 |
| 4 | 60 | 55 | | 68 |
| 5 | 50 | 55 | | 115 |
| 6 | 70 | 70 | | 46 |
| 7 | 55 | 70 | | 82 |
| 8 | 60 | 85 | | 75 |
| 10 | 55 | 50 | | 92 |
| 11 | 50 | 55 | | 103 |
| 12 | 60 | 65 | | 71 |
| TETA | 10 | 50 | | 124 |
| Tohmide 245 | 50 | 75 | | 39 |

EXAMPLE 3

Resin specimens prepared from the batches described in Example 2 were subjected to heat distortion tests (ASTM D648–56) and flexure tests (ASTM D790–63), and the curing conditions and test results are listed in Table 3, wherein R.T. is room temperature, all other temperatures are in °C., and HDT is heat distortion temperature. No failure under the available test conditions is indicated by =.

TABLE 3

| Curing Agent | Curing Conditions HDT | Strain Max., mm | Strength kg/mm² | Modulus kg/mm² |
|---|---|---|---|---|
| No. 1 | R.T. 80 | 31.3 | 14.4 | 388 |
|  | 3 hrs/80°75 | 29.2 | 12.2 | 298 |
| No. 2 | R.T. 52 | 20.0 | 10.0 | 290 |
|  | 3 hrs/80° 55 | = | 10.8 | 311 |
| No. 3 | R.T. 75 | = | 11.0 | 290 |
|  | 3 hrs/80°77 | 29.6 | 11.0 | 287 |
| No. 4 | R.T. 74 | 33.7 | 11.4 | 292 |
|  | 3 hrs/80°65 | = | 10.7 | 309 |
| No. 5 | R.T. 52 | 21.0 | 10.0 | 295 |
|  | 3 hrs/120°75 | = | 11.5 | 313 |
| No. 6 | R.T. 58 | 34.2 | 10.5 | 320 |
|  | 3 hrs/100°55 | = | 10.7 | 310 |
| No. 7 | R.T. 79 | 28.5 | 11.2 | 290 |
|  | 3 hrs/80°74 | 31.7 | 11.4 | 296 |

| | | | |
|---|---|---|---|
| No. 8 R.T. 60 | 25.0 | 10.1 | 250 |
| No. 10 R.T. 75 | 29.5 | 12.0 | 320 |
| No. 11 R.T. 55 | 25.0 | 10.5 | 301 |
| 3 hrs/80°70 | 31.1 | 11.0 | 310 |
| No. 12 R.T. 65 | 29.1 | 11.1 | 300 |
| TETA R.T. 55 | 4.6 | 9.15 | 388 |
| 3hrs/100°79 | 15.6 | 13.7 | 320 |
| Tohmide 245  3 hrs/65°64 | 20.7 | 9.85 | 242 |

EXAMPLE 4

Test specimens were prepared from 80 g each of compositions listed in Table 2 by curing the mixtures in cylindrical molds of 70 mm diameter and 30 mm depth together with a spring washer of one inch diameter at room temperature for 14 days. They were then tested for thermal shock resistance by up to ten cycles of alternating immersion in boiling water and in ice water for periods of 30 minutes, and inspected. The results are listed in Table 4 in which the ratings have the following meaning:

A No cracks  D Considerably cracked
B Slight crack  E Large and numerous cracks
C Small crack  + Cracked during curing Where more than one line is associated with a curing agent, more than one specimen was tested. No. 7A differed from No. 7 in Table 2 by use of 70 percent curing agent (15 percent excess).

TABLE 4

Number of Cycles
Curing Agent 1 2 3 4 5 6 7 8 9 10

No. 6 A A A A A A A
    A A A
    A A A A A A A A A
    A A A A A A A A A
No. 7 C D D D D D D
    D D D
    C D E
    A A A B D E
No. 7A B B B B B B B
    B B B
    A A A A A A A B B
    A A A A A A A A A
No. 4 C C C C C C C
    C C C
    B C C C C C C C C C
No. 5 A A A A A A A
    A A A
    A A A A A A A A A
TETA E+ E E E E E E
    E E E
    E E E E E E E E E
Tohmide 245 E E E E
    E E E E E
    E E E E E E E E E

EXAMPLE 5

Epoxy resins prepared by curing mixtures of the invention described in Example 2 at room temperature for 14 days were machined to test bars 15 mm × 15 mm × 45 mm having a transverse semicylindrical notch of 1 mm radius in the center of one of the elongated rectangular faces. The notched specimens were subjected to Sharpy impact resistance tests according to Japanese Industrial Standard K-6911. Mean values of six tests are listed in Table 5. The capacity of the apparatus used was 15.7 kg-cm/cm$^2$, and values of 15.7+ in the Table indicate that the specimen did not fail. Comparison tests were run with a mixture prepared from Epon 828 and 9 percent TETA cured 14 days at room temperature, and with a mixture of Epon 828 with 50 percent Tohmide 245 cured at 65° C. for 3 hours.

TABLE 5

| Curing Agent Impact resistance, kg-cm/cm$^2$ | No. 6 | No. 7 | No. 4 | No. 5 | TETA | Tohmide |
|---|---|---|---|---|---|---|
| | 14.4 | 15.7+ | 14.3 | 15.7+ | 4.3 | 8.9 |

EXAMPLE 6

The mixtures described in Example 5 were cured in a glass mold at 120° C., for 30 minutes to prepare resin sheets from which tensile test specimens were machined to the specifications of Japanese Industrial Standard K-6911. The specimens were tested for tensile strength and modulus of elasticity in tension at 21° C., R.H. 65 percent, at a cross-head speed of 5 mm/sec. Mean values in kg/mm$^2$ of the results obtained with three to six specimens are listed in Table 6.

TABLE 6

| Curing Agent | Tensile Strength | Modulus |
|---|---|---|
| No. 6 | 7.15 | 232 |
| No. 7 | 6.52 | 194 |
| No. 4 | 7.15 | 235 |
| No. 5 | 7.30 | 216 |
| TETA | 5.09 | 273 |
| Tohmide 245 | 6.89 | 237 |

EXAMPLE 7

53 g Acrylonitrile (1 mole) were added dropwise to 274 g (1 mole) 3,9-bis(3-aminopropyl)-2,4,8,10-tetroxaspiro[5,5] undecane in a flask at 45°–55° C. over one hour. The mixture was kept at the same temperature for an additional hour with stirring to produce an adduct which was a transparent viscous liquid. Corresponding adducts were also prepared from the same reactants in a different mole ratio and from other 2,4,8,10-tetroxaspiro[5,5]undecane derivatives differing in their substituents in positions 3 and 9. Table 7 lists the substituents, the mole ratio of diamine to acrylonitrile employed in each reaction, and a number assigned to the adduct or curing agent for further reference hereinbelow

TABLE 7

| Curing Agent | 3,9-Substituents | Mole Ratio |
|---|---|---|
| No. 13 | 3,9-bis(3-aminopropyl) | 1:1 |
| No. 14 | 3,9-bis(3-aminopropyl) | 2:1 |
| No. 15 | 3,9-bis(4-aminobutyl) | 1:1 |
| No. 16 | 3,9-bis(2-aminoethyl) | 2:1 |
| No. 17 | 3,9-bis(1,1-dimethyl-4-aminobutyl) | 1:1 |
| No. 18 | 3,9-diethyl-3,9-bis(2-aminoethyl) | 2:1 |

EXAMPLE 8

The adducts listed in Table 7, TETA, and Tohmide 245, were added to Epon 828 in amounts listed in Table 8. 500 g Batches of the mixtures were kept at 20°±1° C. and 65 percent R.H., and they reacted exothermally to form gels. The time to gel (pot life), the maximum exotherm, and the time to reach the maximum temperature were determined and are listed in Table 8.

TABLE 8

| Curing Agent | Pot Life Min. | Max. Exotherm, °C | Time to Max. Exotherm, min. |
|---|---|---|---|
| No. 13 63% | 130 | 178 | 150 |
| No. 14 49 | 70 | 200 | 90 |
| No. 15 63% | 100 | 170 | 120 |
| No. 16 42 | 65 | 189 | 90 |
| No. 17 78 | 105 | 165 | 124 |
| No. 18 54 | 70 | 180 | 92 |
| TETA 9 | 30 | 200–210 | 60 |
| Tohmide 245 50 | 48 | 157 | 72 |

The curing agents of the invention listed in Table 8 formed gels more slowly than the known agents although the maximum exotherm values were nearly the same. This is of particular value in casting compositions.

EXAMPLE 9

Heat distortion and flexure tests were performed on the resins formed according to Example 8 after room temperature curing for the resins of the invention and one batch of TETA-cured resin (TETA A), and after curing at 100° C. for three hours for the TETA-cured resin B, and at 65° C. for three hours for the resin cured with Tohmide 245. The test conditions were as described in Example 3. The resins cured according to this invention had the same color as uncured Epon 828. The conventionally cured resins were yellow or yellowish brown. The test results are listed in Table 9 in the manner of Table 3.

TABLE 9

| Curing Agent | HDT | Strain Max., mm | Strength kg/mm² | Modulus kg/mm² |
| --- | --- | --- | --- | --- |
| No. 13 | 69.5 | 32.3 | 11.6 | 298 |
| No. 14 | 80.7 | 25.0 | 12.4 | 297 |
| No. 15 | 65.0 | 30.0 | 11.0 | 295 |
| No. 16 | 72.1 | 24.2 | 12.1 | 290 |
| No. 17 | 70.1 | 31.3 | 11.5 | 293 |
| No. 18 | 71.0 | 25.0 | 12.2 | 300 |
| TETA A | 55.0 | 4.6 | 9.15 | 388 |
| TETA B | 78.0 | 15.6 | 13.7 | 320 |
| Tohmide 245 | 64.0 | 20.7 | 9.85 | 242 |

EXAMPLE 10

Epon 828 was mixed with ATU (35 percent), adduct No. 1 (60 percent), No. 2 (60 percent), No. 3 (50 percent), TETA (10 percent) and Tohmide 245 (50 percent). The mixtures so prepared were cured as indicated in Table 10 and subjected to flexure tests under the conditions of Examples 3 and 9. While comparable values for maximum strength and elastic modulus were recorded for the tested resins prepared with curing agents of the invention and ATU alone, the resins cured with the adducts of the invention were superior in their values of maximum strain before failure to the specimens cured with ATU alone and to those cured with TETA or Tohmide 245 under comparable conditions.

TABLE 10

| Curing Agent | Curing Conditions | Max. Strain, mm |
| --- | --- | --- |
| ATU | R.T. | 19.3 |
|  | 30 min./80° | 21.8 |
| No. 1 | R.T. | 31.3 |
|  | 3 hrs./80° | 29.7 |
| No. 2 | R.T. | 20.0 |
|  | 3 hrs./80° | = |
| No. 3 | R.T. | = |
|  | 3 hrs./80° | 29.6 |
| TETA | R.T. | 4.6 |
|  | 3 hrs./100° | 15.6 |
| Tohmide 245 | 3 hrs./65° | 20.7 |

Epon 828 was chosen in all preceding Examples as the resin intermediate for demonstrating the superior mechanical properties of epoxy resins cured by means of the curing agents of the invention in order to facilitate correlation of the several sets of data. However, closely analogous results were obtained with all other commercially available epoxy resin intermediates which we have been able to test. Epon 828 is merely representative of the glycidyl ethers of bisphenol A, the polycondensation products of the ether, and mixtures thereof, which are useful both as reaction partners for the aforementioned spiroacetal diamines in preparing the curing agents, and as resin intermediates which may be hardened by means of the curing agents.

Epon 828 is a liquid mixture of such ethers or ether polycondensation products which has an average molecular weight of approximately 380, a corresponding epoxy equivalent of 185 to 192 g per gram equivalent of epoxide, and an esterification value of about 85. It is prepared by condensation of bisphenol A with epichlorohydrin as generally described in British Patent No. 974,139. The commercially available product has a color of 8 max. (Gardner) and a viscosity of 135 to 160 poises.

Epon 1001, referred to in Table 1, has an average molecular weight of approximately 900 with a corresponding epoxy equivalent of 425–550, and an esterification value of 145. It is a solid melting at 65°–75° C., a Gardner color of 4 max., and a viscosity of D–G on the Gardner-Holdt scale as determined in a 40 percent solution of the material in diethyleneglycol monobutyl ether at 25° C.

Epon 834 is a liquid which is intermediate in molecular weight (approximately 480), epoxy equivalent, esterification value and viscosity between the two epoxides described above, and has been used successfully as a reaction partner for the spiroacetal diamines and as a resin intermediate according to this invention.

What is claimed is:

1. A reaction product of a spiroacetal diamine of the formula

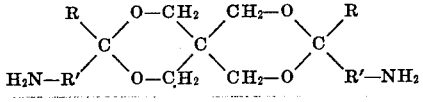

wherein R is hydrogen, methyl or ethyl, and R' is straight or branched alkyl having one to six carbon atoms, with the ratio of said spiroacetal diamine to said acrylonitrile being between 0.25 and 10 moles of said spiroacetal diamine per mole of said acrylonitrile.

2. A product as set forth in claim 1, which is a viscous liquid at 20° C.

* * * * *

UNITED STATES PATENT OFFICE
CERTIFICATE OF CORRECTION

Patent No. 3679707            Dated July 25, 1972

Inventor(s) Ippei Yoshimura et al.

It is certified that error appears in the above-identified patent and that said Letters Patent are hereby corrected as shown below:

Column 10, line 46, after "with" insert -- acrylonitrile , --

Signed and sealed this 2nd day of January 1973.

(SEAL)
Attest:

EDWARD M. FLETCHER, JR.            ROBERT GOTTSCHALK
Attesting Officer                      Commissioner of Patents